United States Patent
Kung

(10) Patent No.: US 9,153,992 B2
(45) Date of Patent: Oct. 6, 2015

(54) HIGH-TEMPERATURE RESISTANT POWER BANK CIRCUIT

(71) Applicant: Nien-Hui Kung, Hsinchu (TW)

(72) Inventor: Nien-Hui Kung, Hsinchu (TW)

(73) Assignee: RICHTEK TECHNOLOGY CORPORATION, Chupei, Hsin-Chu (TW)

( * ) Notice: Subject to any disclaimer, the term of this patent is extended or adjusted under 35 U.S.C. 154(b) by 446 days.

(21) Appl. No.: 13/712,791

(22) Filed: Dec. 12, 2012

(65) Prior Publication Data

US 2014/0159492 A1 Jun. 12, 2014

(51) Int. Cl.
*H01M 10/46* (2006.01)
*H02J 7/00* (2006.01)

(52) U.S. Cl.
CPC .............. *H02J 7/0091* (2013.01); *H02J 7/0068* (2013.01); *Y10T 307/604* (2015.04)

(58) Field of Classification Search
CPC ................................ H02J 7/047; H02J 7/1453
USPC .......................... 320/107, 127, 128, 135, 150
See application file for complete search history.

(56) References Cited

U.S. PATENT DOCUMENTS

2002/0070710 A1* 6/2002 Yagi et al. ..................... 320/150
2004/0135553 A1* 7/2004 Sakakibara ................... 320/150

* cited by examiner

*Primary Examiner* — Edward Tso
(74) *Attorney, Agent, or Firm* — Tung & Associates

(57) ABSTRACT

The present invention discloses a power bank circuit. The power bank circuit includes a charger circuit, a battery circuit, a power conversion circuit, a temperature detecting circuit and a current distribution circuit. The charger circuit receives an input voltage and provides a charging current to the battery circuit. The power conversion circuit converts a battery voltage to an output voltage and provides an output current. The temperature detecting circuit detects the temperature of the packaged structure. When the temperature of the packaged structure exceeds a first predetermined temperature, the current distribution circuit first reduces the output current. When the temperature of the packaged structure exceeds a second predetermined temperature, the current distribution circuit then reduces the charging current.

7 Claims, 4 Drawing Sheets

HIGH-TEMPERATURE RESISTANT POWER BANK CIRCUIT

BACKGROUND OF THE INVENTION

1. Field of Invention

The present invention relates to a power bank circuit; particularly, it relates to such power bank circuit possessing high-temperature resistant capability.

2. Description of Related Art

A power bank circuit has a charger circuit and a battery circuit. The charger circuit can charge the battery in the battery circuit. The battery circuit has a charging path and a discharging path. Generally, the charger circuit is capable of detecting its temperature. When the detected temperature exceeds a predetermined temperature, the charging current supplied from the charger circuit to the battery is reduced, thus preventing the circuit from being damaged by high temperature.

In the above-mentioned prior art, reducing the charging current will prolong the charging time, which is a drawback. If the charger circuit fails to lower down its temperature, the charging time will be prolonged longer.

In view of the above, to overcome the drawbacks in the prior art, the present invention proposes a power bank circuit capable of continuing charging even though the temperature rises up to a predetermined temperature, thereby saving the charging time while still providing protection against high temperature.

SUMMARY OF THE INVENTION

An objective of the present invention is to provide a power bank circuit.

To achieve the above and other objectives, from one perspective, the present invention provides a power bank circuit, comprising: a charger circuit for generating a charging current; a battery circuit coupled to the charger circuit, for receiving the charging current so as to charge a battery included therein and providing a battery voltage; a power conversion circuit for converting the battery voltage to an output voltage and providing an output current; a temperature detecting circuit for detecting a temperature and generating a temperature detecting signal accordingly; and a current distribution circuit coupled to the temperature detecting circuit, the charger circuit and the power conversion circuit, for adaptively adjusting the output current and/or the charging current in response to the temperature detecting signal; wherein when the temperature indicated by the temperature detecting signal exceeds a first predetermined temperature, the current distribution circuit reduces the output current; when the temperature indicated by the temperature detecting signal exceeds a second predetermined temperature, the current distribution circuit reduces the charging current; wherein the second predetermined temperature is higher than the first predetermined temperature.

In one embodiment, the power conversion circuit includes a regulator circuit coupled to the battery circuit, for converting the battery voltage to the output voltage, and the current distribution circuit is coupled to the regulator circuit.

In another embodiment, the power conversion circuit includes: a regulator circuit coupled to the battery circuit, for converting the battery voltage to a regulated voltage and providing a regulated current; and a load switch circuit coupled to the regulator circuit, for converting the regulated voltage to the output voltage and providing the output current.

In above-mentioned embodiment, the current distribution circuit is coupled to the regulator circuit, or the load switch circuit, or both.

In above-mentioned embodiment, when the temperature indicated by the temperature detecting signal exceeds a first predetermined temperature, the regulated current can also be reduced, wherein the load switch circuit is not disposed in the packaged structure.

In another embodiment, the present invention provides a power bank circuit, comprising: a charger circuit for generating a charging current; a battery circuit coupled to the charger circuit, for receiving the charging current so as to charge a battery included therein and providing a battery voltage; a regulator circuit coupled to the battery circuit, for converting the battery voltage to a regulated voltage and providing a regulated current; a load switch circuit coupled to the regulator circuit, for providing an output current; a temperature detecting circuit for detecting a temperature and generating a temperature detecting signal accordingly; and a current distribution circuit coupled to the temperature detecting circuit, the charger circuit and the regulator circuit, for adaptively adjusting the regulated current and/or the charging current in response to the temperature detecting signal; wherein when the temperature indicated by the temperature detecting signal exceeds a first predetermined temperature, the current distribution circuit reduces the regulated current; when the temperature indicated by the temperature detecting signal exceeds a second predetermined temperature, the current distribution circuit reduces the charging current; wherein the second predetermined temperature is higher than the first predetermined temperature.

In one embodiment, the current distribution circuit is coupled to the load switch circuit and when the temperature indicated by the temperature detecting signal exceeds a first predetermined temperature, the output current is reduced.

The objectives, technical details, features, and effects of the present invention will be better understood with regard to the detailed description of the embodiments below, with reference to the attached drawings.

DESCRIPTION OF THE PREFERRED EMBODIMENTS

Figure 1:
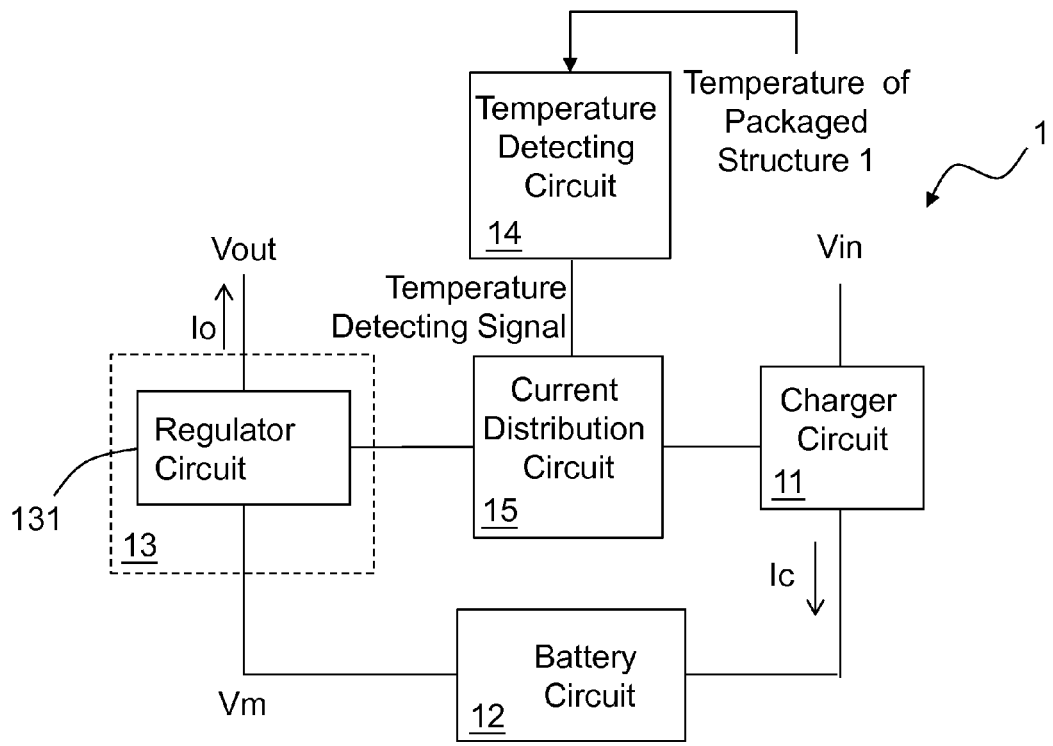
FIG. 1 shows a first embodiment of the present invention.
Figures 2A, 2B, 2C:
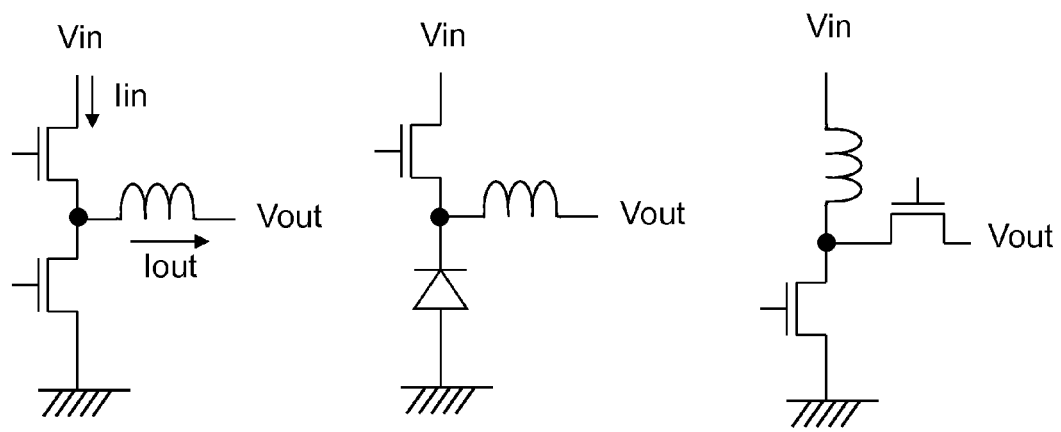
FIGS. 2A-2J show synchronous and asynchronous buck, boost, inverting, buck-boost and inverting-boost power stage circuits, respectively.
Figure 2D:
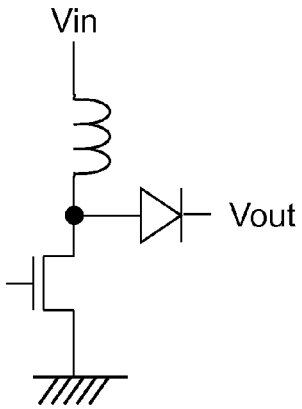
Figure 2E:
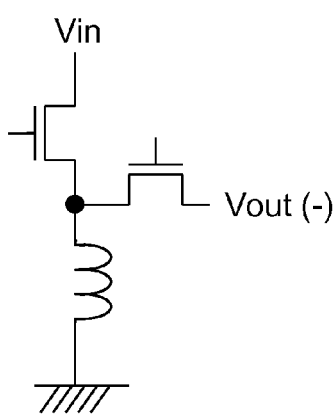
Figure 2F:
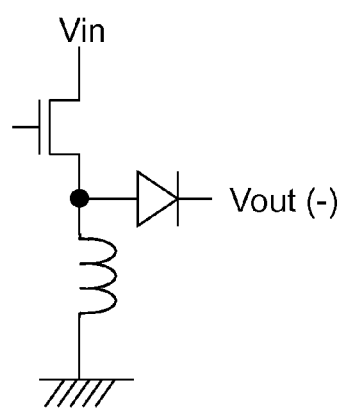
Figure 2G:
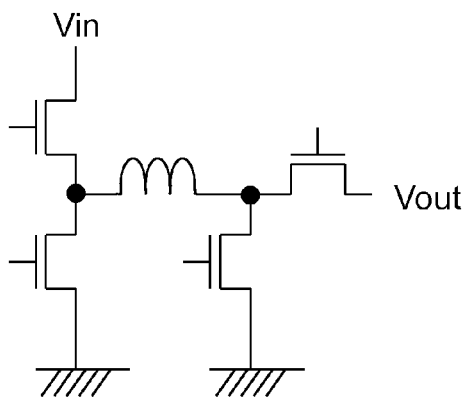
Figure 2H:
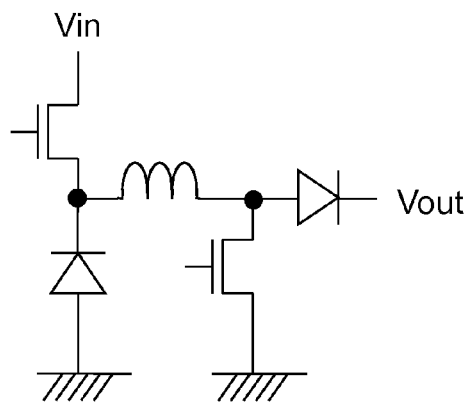
Figure 2I:
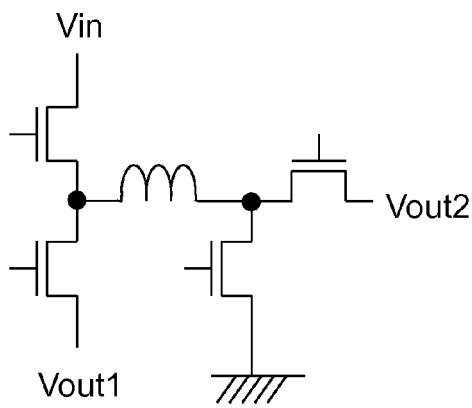
Figure 2J:
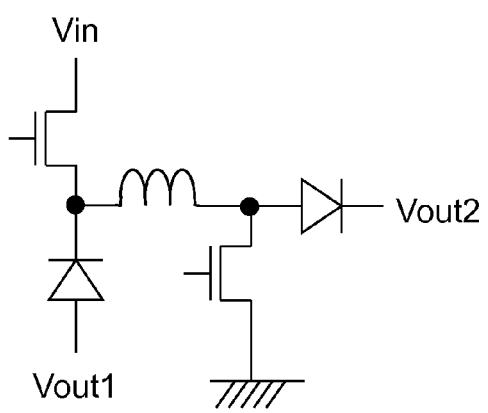

Please refer to FIG. 1, which shows a first embodiment of the present invention. As shown in FIG. 1, the power bank 1 comprises a charger circuit 11, a battery circuit 12, a power conversion circuit 13, a temperature detecting circuit 14 and a current distribution circuit 15. In this embodiment, the charger circuit 11 is coupled to the input voltage Vin and generates a charging current Ic. The charger circuit 11 can be, for example but not limited to, a low dropout regulator or a switching regulator. The battery circuit 12 is coupled to the charger circuit 11, for receiving the charging current Ic so as to charge a battery included therein and providing a battery voltage Vm. In this embodiment, the power conversion circuit 13 includes, for example, a regulator circuit 131, for converting the battery voltage Vm to the output voltage Vout and providing an output current Io. The regulator circuit 131 can regulate the output voltage Vout or the output current Io, or both. The regulator circuit 131 can be, for example but not limited to, a switching regulator. The power stage of the switching regulator can be synchronous or asynchronous buck, boost, inverting, buck-boost or inverting-boost power stage circuits, as shown in FIGS. 2A-2J. The temperature detecting circuit 14 is for detecting the temperature of the packaged structure and generating a temperature detecting signal accordingly. The current distribution circuit 15 is coupled to the temperature detecting circuit 14, the charger circuit 11 and the power conversion circuit 13, for adaptively adjusting the output current Io and/or the charging current Ic in response to the temperature detecting signal. The current distribution circuit 15 provides output signals to the regulator circuit 131 and the charger circuit 11 to respectively determine or adjust the output current Io and the charging current Ic. When the temperature indicated by the temperature detecting signal exceeds a first predetermined temperature, the current distribution circuit 15 first reduces the output current Io and keeps the charging current Ic unchanged; when the temperature indicated by the temperature detecting signal exceeds a higher second predetermined temperature, the current distribution circuit 15 then starts reducing the charging current Ic.

The above arrangement to reduce the output current Io and keep the charging current Ic unchanged when the detected temperature is high is better than prior art because it can maintain the charging efficiency while lowering down the temperature of the circuit. The charging current Ic is reduced as a next step when the detected temperature still increases. Thus, while the charging efficiency is maintained, the safety is also ensured, hence preventing the circuit from being damaged.

Figure 3:
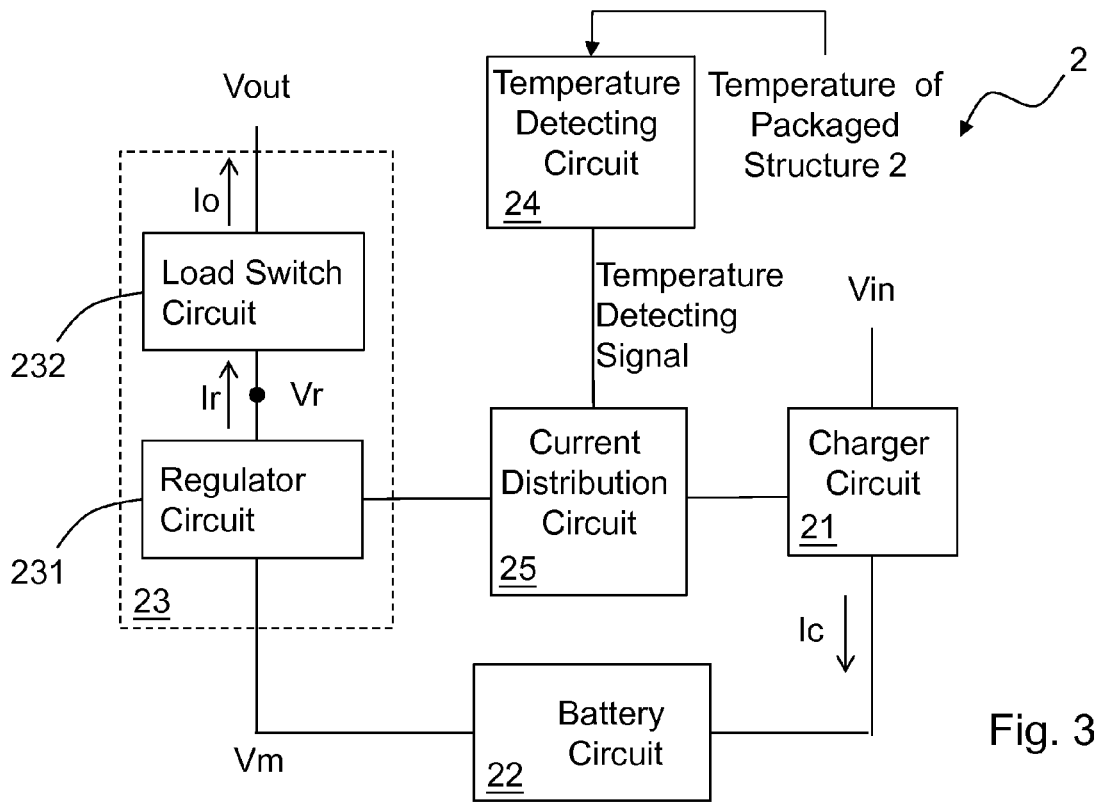
FIG. 3 shows a second embodiment of the present invention.

FIG. 3 shows a second embodiment of the present invention. As shown in FIG. 3, the power bank circuit 2 comprises a charger circuit 21, a battery circuit 22, a power conversion circuit 23, a temperature detecting circuit 24 and a current distribution circuit 25. This embodiment is different from the first embodiment in that the power conversion circuit 23 includes a regulator circuit 231 and a load switch circuit 232. The regulator circuit 231 is coupled to the battery circuit 22, for converting the battery voltage Vm to a regulated voltage Vr and providing a regulated current Ir. The load switch circuit 232 is coupled to the regulator circuit 231, for converting the regulated voltage Vr to the output voltage Vout (the output voltage Vout can be equal to or not equal to the regulated voltage Vr) and providing the output current Io (the output current Io can be equal to or not equal to the regulated current Ir). The load switch circuit 232 can be a typical ON/OFF switch for determining whether to provide the output voltage Vout and the output current Io (under this circumstance, the output voltage Vout can be equal to the regulated voltage Vr and the output current Io can be equal to the regulated current Ir). Or, the load switch circuit 232 can be a circuit with voltage or current regulation capability. For example, the load switch circuit 232 can be, but not limited to, a low dropout regulator (under this circumstance, the output voltage Vout can be not equal to the regulated voltage Vr) or a current control circuit (under this circumstance, the output current Io can be not equal to the regulated current Ir).

In this embodiment, the current distribution circuit 25 is coupled to the regulator circuit 231. When the temperature indicated by the temperature detecting signal exceeds a first predetermined temperature, the regulated current Ir is first reduced and the charging current Ic is kept unchanged, thus not only lowering down the temperature of the circuit but also maintaining the charging efficiency. If the temperature of the packaged structure still keeps rising above a second predetermined temperature, then the charging current Ic is reduced. Thus, while the charging efficiency is maintained, the safety is also ensured, hence preventing the circuit from being damaged.

Figure 4:
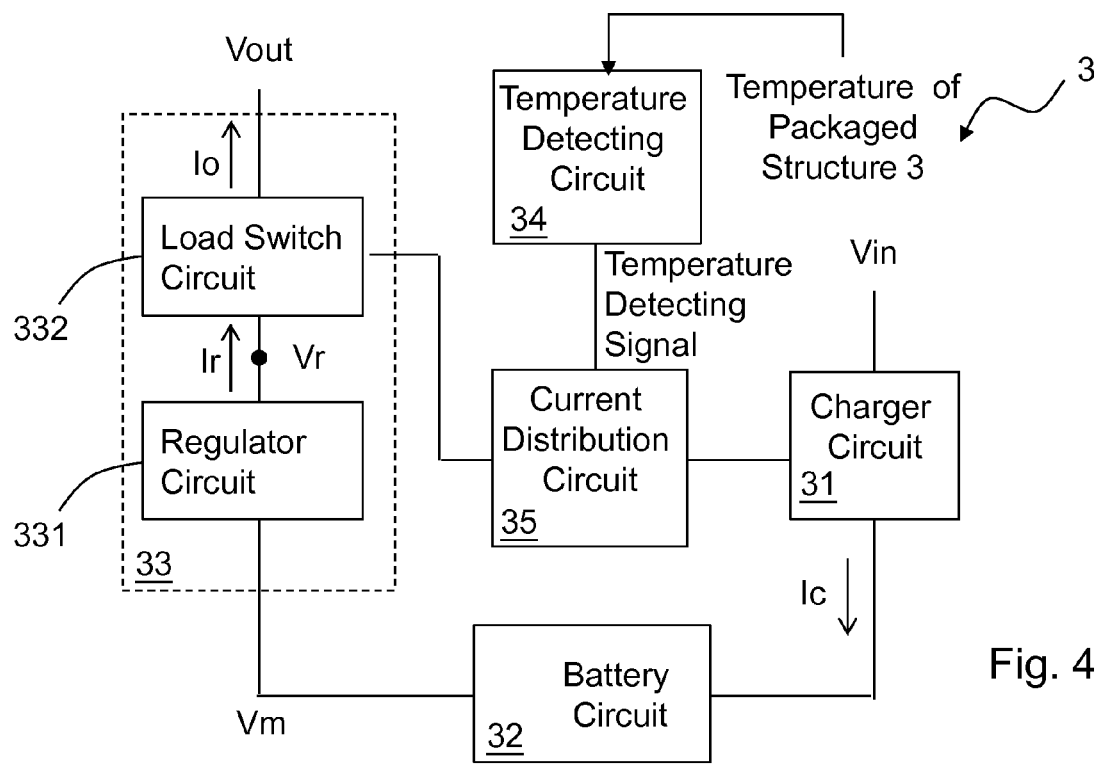
FIG. 4 shows a third embodiment of the present invention.

FIG. 4 shows a third embodiment of the present invention. As shown in FIG. 4, the power bank circuit 3 comprises a charger circuit 31, a battery circuit 32, a power conversion circuit 33, a temperature detecting circuit 34 and a current distribution circuit 35. This embodiment is different from the first embodiment but is similar to the second embodiment in that the power conversion circuit 33 includes a regulator circuit 331 and a load switch circuit 332. The regulator circuit 331 is coupled to the battery circuit 32, for converting the battery voltage Vm to a regulated voltage Vr and providing a regulated current Ir. The load switch circuit 332 is coupled to the regulator circuit 331, for converting the regulated voltage Vr to the output voltage Vout (the output voltage Vout can be equal to or not equal to the regulated voltage Vr) and providing the output current Io (the output current Io can be equal to or not equal to the regulated current Ir). The load switch circuit 332 can be a typical ON/OFF switch for determining whether to provide the output voltage Vout and the output current Io (under this circumstance, the output voltage Vout can be equal to the regulated voltage Vr and the output current Io can be equal to the regulated current Ir). Or, the load switch circuit 332 can be a circuit with voltage or current regulation capability. For example, the load switch circuit 332 can be, but not limited to, a low dropout regulator (under this circumstance, the output voltage Vout can be not equal to the regulated voltage Vr) or a current control circuit (under this circumstance, the output current Io can be not equal to the regulated current Ir).

In this embodiment, the current distribution circuit 35 is coupled to the load switch circuit 332. When the temperature indicated by the temperature detecting signal exceeds a first predetermined temperature, the output current Io is first reduced and the charging current Ic is kept unchanged, thus not only lowering down the temperature of the circuit but also maintaining the charging efficiency. If the temperature of the packaged structure still keeps rising above a second predetermined temperature, then the charging current Ic is reduced unless. Thus, while the charging efficiency is maintained, the safety is also ensured, hence preventing the circuit from being damaged.

Figure 5:
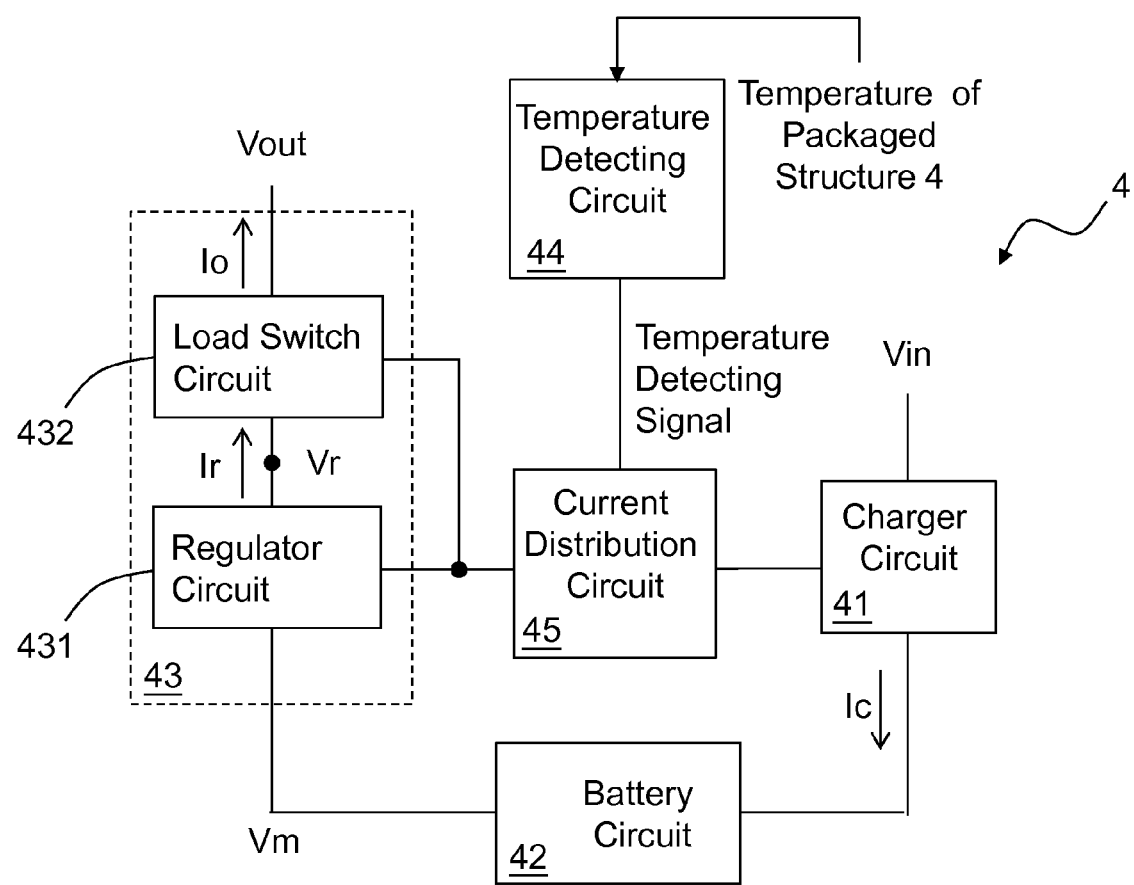
FIG. 5 shows a fourth embodiment of the present invention.

FIG. 5 shows a fourth embodiment of the present invention. As shown in FIG. 5, the power bank circuit 4 comprises a charger circuit 41, a battery circuit 42, a power conversion circuit 43, a temperature detecting circuit 44 and a current distribution circuit 45. This embodiment is different from the first embodiment but is similar to the second embodiment in that the power conversion circuit 43 includes a regulator circuit 431 and a load switch circuit 432. The regulator circuit 431 is coupled to the battery circuit 42, for converting the battery voltage Vm to a regulated voltage Vr and providing a regulated current Ir. The load switch circuit 432 is coupled to the regulator circuit 431, for converting the regulated voltage Vr to the output voltage Vout (the output voltage Vout can be equal to or not equal to the regulated voltage Vr) and providing the output current Io (the output current Io can be equal to or not equal to the regulated current Ir). The load switch circuit 432 can be a typical ON/OFF switch for determining whether to provide the output voltage Vout and the output current Io (under this circumstance, the output voltage Vout can be equal to the regulated voltage Vr and the output current Io can be equal to the regulated current Ir). Or, the load switch circuit 432 can be a circuit with voltage or current regulation capability. For example, the load switch circuit 432 can be, but not limited to, a low dropout regulator (under this circumstance, the output voltage Vout can be not equal to the regulated voltage Vr) or a current control circuit (under this circumstance, the output current Io can be not equal to the regulated current Ir).

In this embodiment, the current distribution circuit 45 is coupled to both the regulator circuit 431 and the load switch circuit 432. When the temperature indicated by the temperature detecting signal exceeds a first predetermined temperature, the circuit first reduces the regulated current Ir or the output current Io, or both, but keeps the charging current Ic unchanged, thus not only lowering down the temperature of the circuit but also maintaining the charging efficiency. If the temperature of the packaged structure still keeps rising above a second predetermined temperature, then the charging current Ic is reduced. Thus, while the charging efficiency is maintained, the safety is also ensured, hence preventing the circuit from being damaged.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, a device which does not substantially influence the primary function of a signal can be inserted between any two devices in the shown embodiments, such as a switch. For another example, the temperature detection is not limited to detecting the temperature of the packaged structure as illustrated by the embodiments; the present invention can detect other temperatures such as the temperature of the circuit or the environment. For yet another example, the input voltage Vin, the charging current Ic, the regulated voltage Vr, the regulated current Ir, the output voltage Vout and the output current Io are not limited to be a constant but can be a variable under normal operation (i.e., when the temperature does not exceed the first predetermined temperature). For instance, when the regulator circuits 131, 231, 331 and 431 are for regulating current, the output voltage Vout can be a variable; when the regulator circuits 131, 231, 331 and 431 are for regulating voltage, the output current Io can be a variable. In view of the foregoing, the spirit of the present invention should cover all such and other modifications and variations, which should be interpreted to fall within the scope of the following claims and their equivalents.

What is claimed is:

1. A power bank circuit, comprising:
   a charger circuit for generating a charging current;
   a battery circuit coupled to the charger circuit, for receiving the charging current so as to charge a battery included therein and providing a battery voltage;
   a power conversion circuit for converting the battery voltage to an output voltage and providing an output current;
   a temperature detecting circuit for detecting a temperature of a packaged structure and generating a temperature detecting signal accordingly; and
   a current distribution circuit coupled to the temperature detecting circuit, the charger circuit and the power conversion circuit, for adaptively adjusting the output current and/or the charging current in response to the temperature detecting signal;
   wherein when the temperature indicated by the temperature detecting signal exceeds a first predetermined temperature, the current distribution circuit reduces the output current; when the temperature indicated by the temperature detecting signal exceeds a second predetermined temperature, the current distribution circuit reduces the charging current;
   wherein the second predetermined temperature is higher than the first predetermined temperature.

2. The power bank circuit of claim 1, wherein the power conversion circuit includes a regulator circuit coupled to the battery circuit, for converting the battery voltage to the output voltage, the current distribution circuit being coupled to the regulator circuit.

3. The power bank circuit of claim 1, wherein the power conversion circuit includes:
   a regulator circuit coupled to the battery circuit, for converting the battery voltage to a regulated voltage and providing a regulated current; and
   a load switch circuit coupled to the regulator circuit, for converting the regulated voltage to the output voltage and providing the output current.

4. The power bank circuit of claim 3, wherein the current distribution circuit is coupled to the regulator circuit, or the load switch circuit, or both.

5. The power bank circuit of claim 3, wherein when the temperature indicated by the temperature detecting signal exceeds a first predetermined temperature, the regulated current is reduced.

6. A power bank circuit, comprising:
   a charger circuit for generating a charging current;
   a battery circuit coupled to the charger circuit, for receiving the charging current so as to charge a battery included therein and providing a battery voltage;
   a regulator circuit coupled to the battery circuit, for converting the battery voltage to a regulated voltage and providing a regulated current;
   a load switch circuit coupled to the regulator circuit, for providing an output current;
   a temperature detecting circuit for detecting a temperature of a packaged structure and generating a temperature detecting signal accordingly; and
   a current distribution circuit coupled to the temperature detecting circuit, the charger circuit and the regulator circuit, for adaptively adjusting the regulated current and/or the charging current in response to the temperature detecting signal;
   wherein when the temperature indicated by the temperature detecting signal exceeds a first predetermined temperature, the current distribution circuit reduces the regulated current; when the temperature indicated by the temperature detecting signal exceeds a second predetermined temperature, the current distribution circuit reduces the charging current;
   wherein the second predetermined temperature is higher than the first predetermined temperature.

7. The power bank circuit of claim 6, wherein the current distribution circuit is coupled to the load switch circuit and when the temperature indicated by the temperature detecting signal exceeds a first predetermined temperature, the output current is reduced.

* * * * *